United States Patent
Sunaga et al.

(10) Patent No.: US 6,400,785 B1
(45) Date of Patent: Jun. 4, 2002

(54) SIGNAL RESYNCHRONIZATION APPARATUS HAVING CAPABILITY TO AVOID DATA CORRUPTION

(75) Inventors: Hideo Sunaga, Yokohama; Nobuyuki Nemoto, Kawasaki, both of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/262,707

(22) Filed: Mar. 4, 1999

(30) Foreign Application Priority Data

Jul. 13, 1998 (JP) .......................... 10-197149

(51) Int. Cl.[7] .................. H04L 25/36; H04L 25/40; H04L 7/00
(52) U.S. Cl. ....................... 375/372; 370/907
(58) Field of Search ................ 375/372, 371, 375/354; 370/907, 503; 711/109, 110; 369/60.01; 365/220

(56) References Cited

U.S. PATENT DOCUMENTS

| | | | |
|---|---|---|---|
| 4,402,079 A | | 8/1983 | Fellinger et al. |
| 4,429,386 A | | 1/1984 | Graden |
| 4,561,095 A | | 12/1985 | Khan |
| 5,052,025 A | * | 9/1991 | Duff et al. ............... 375/262 |
| 5,067,126 A | * | 11/1991 | Moore ..................... 370/544 |
| 5,142,529 A | * | 8/1992 | Parruck et al. ........... 370/545 |
| 5,293,409 A | * | 3/1994 | Doornenbal et al. ..... 375/354 |
| 5,335,223 A | * | 8/1994 | Iino ......................... 370/503 |
| 5,471,476 A | * | 11/1995 | Hiramoto ................. 370/516 |
| 5,537,447 A | * | 7/1996 | Urbansky ................. 375/372 |
| 5,563,891 A | * | 10/1996 | Wang ....................... 370/505 |
| 5,583,894 A | | 12/1996 | Linsley |

FOREIGN PATENT DOCUMENTS

| | | |
|---|---|---|
| EP | 0 425 964 | 5/1991 |
| JP | 61-198471 | 9/1986 |
| JP | 63-306729 | 12/1988 |
| JP | 1-101748 | 4/1989 |
| JP | 3-98341 | 4/1991 |
| JP | 3-106235 | 5/1991 |
| JP | 4-119012 | 4/1992 |
| JP | 5-88992 | 4/1993 |
| JP | 6-69913 | 3/1994 |
| JP | 8-111851 | 4/1996 |

* cited by examiner

Primary Examiner—Chi Pham
Assistant Examiner—Phuong Phu
(74) Attorney, Agent, or Firm—Katten Muchin Zavis Rosenman

(57) ABSTRACT

An apparatus for resynchronizing data signals by using dual port data buffer storage, which prevents data corruption and subsequent system disruption from happening by employing a mechanism to keep an adequate distance between read and write address pointers. An input unit receives an incoming data stream having a cyclic data structure of N bytes. A data writing unit sequentially writes each data word of the received data stream into a storage unit with a capacity of 2N bytes in synchronization with a first clock. A data reading unit sequentially reads out each data word from the storage unit in synchronization with a second clock. A detection unit tests whether the write and read address pointers have come within a predetermined threshold distance. A relocation unit moves the read address pointer by N bytes to increase the distance between the read and write address pointers, when the detection unit has detected that the write and read address pointers have come within the threshold distance. An outputting unit transmits to an external destination the data words read out by the data reading unit.

2 Claims, 14 Drawing Sheets

| Address | Data |
|---|---|
| ADDRESS: 1 | data1 |
| ADDRESS: 2 | data2 |
| ADDRESS: 3 | data3 |
| ⋮ | ⋮ |
| ADDRESS: X | dataX |
| ⋮ | ⋮ |
| ADDRESS: (N−1) | data(N−1) |
| ADDRESS: N | dataN |
| ADDRESS: (N+1) | data1 |
| ADDRESS: (N+2) | data2 |
| ADDRESS: (N+3) | data3 |
| ⋮ | ⋮ |
| ADDRESS: (N+X) | dataX |
| ⋮ | ⋮ |
| ADDRESS: (2N−1) | data(N−1) |
| ADDRESS: 2N | dataN |

FIG. 3

| ADDRESS | DATA |
|---|---|
| ADDRESS:1 | data1 |
| ADDRESS:2 | data2 |
| ADDRESS:3 | data3 |
| ⋮ | ⋮ |
| ADDRESS:X | dataX |
| ⋮ | ⋮ |
| ADDRESS:(N−1) | data(N−1) |
| ADDRESS:N | dataN |

PRIOR ART
FIG. 12

SIGNAL RESYNCHRONIZATION APPARATUS HAVING CAPABILITY TO AVOID DATA CORRUPTION

BACKGROUND OF THE INVENTION

1. Field of the Invention

The present invention relates to a signal resynchronization apparatus for use in digital communications equipment, and more particularly, to a signal resynchronization apparatus for receiving an incoming data stream in synchronization with a first clock and outputting the same data stream in synchronization with a second clock.

2. Description of the Related Art

In some types of digital communications equipment, signals are received and transmitted with different clock timings. This means that the incoming signal is entered in synchronization with a reception clock (first clock), processed in the equipment, and then retransmitted in synchronization with a transmission clock (second clock). While having the same average frequencies, the first and second clocks are not always in phase. This kind of signal resynchronization is usually accomplished by using, for example, a dual port memory device that functions as first-in first-out (FIFO) buffer storage, as well as allowing write and read operations to be performed independently.

The following section will describe a conventional signal resynchronization apparatus with reference to its block diagram of FIG. 11. As FIG. 11 illustrates, this conventional apparatus comprises a memory 10, a write address generator 11, a phase monitor 12, and a read address generator 13. The memory 10 comprises a dual port RAM having two separate ports to allow simultaneous read and write operations of, for example, 8-bit wide parallel data. FIG. 12 shows the notation of address and data of the memory 10. The memory 10 has N-byte storage cells being addressed from 1 to N (N: an integer number). The write address generator 11 produces write address signals, from 1 to N, in synchronization with a reception clock (first clock). On the other hand, the read address generator 13 generates read address signals, from 1 to N, in synchronization with a transmission clock (second clock).

When the illustrated apparatus is powered up, a power-on reset signal is generated for system initialization purposes. Upon receipt of this power-on reset signal, the phase monitor 12 produces, a control signal to suppress the operation of the read address generator 13 until the difference between the write address and read address reaches a predetermined address distance (or phase difference).

The operation of this conventional signal resynchronization apparatus will now be described below with reference to FIG. 13.

The write address generator 11 produces write address signals in synchronization with the first clock and supplies them to the memory 10 to drive its data input port. The memory 10 accepts write data and stores it into one of its storage cell addressed by the write address signals supplied from the write address generator 11. For example, FIG. 13 shows that an incoming data word "data1" is written into ADDRESS:1, when the write address has a value of "1."

Independently of the above data write operation, the read address generator 13 produces read address signals in synchronization with the second clock and supplies them to the memory 10 to drive its data output port. The memory 10 selects one of its storage cells with the read address signals provided by the read address generator 13 and reads out its contents. For example, a data word "dataX" is read out from ADDRESS:X when the read address has a value of "X," as shown in FIG. 13.

The write and read addresses produced by the write and read address generators 11 and 13 are such a circular address that increases from 1 to N and returns to 1 after reaching N. In other words, there are two independent address pointers to write and read the memory 10 as illustrated in FIG. 13. The write address pointer and read address pointer will cyclically scan the memory 10 while, ideally, keeping a predetermined distance from each other.

FIG. 14 shows a problem situation where the write address pointer has happened to catch up with the read address pointer because of a variation in incoming data timings or the like. In this situation, a write operation can be attempted to the same memory address where a read operation is being effected concurrently. This address pointer overlap would corrupt the read data, and the corrupted data could affect the operation of other part of the system. Particularly when the corrupted data is critical to the system, as in the case of K1/K2 bits for Automatic Protection Switch (APS) functions in the Synchronous Optical Network (SONET) architecture, the data corruption could disrupt the entire system.

Another problem situation may occur when the signal resynchronization apparatus is operating with a small distance (small phase difference) between the write and read address pointers. In such a situation, power supply fluctuations and/or ambient temperature variations would influence the phase difference between the two pointers, and as a result, the apparatus could experience frequent read data corruption. What is worse is that it is often hard to isolate and locate a problem, when it is caused by voltage or temperature variations.

The factors of data corruption problems are not limited within the inside, but can also be observed outside the signal resynchronization apparatus. A break in wiring, for example, will interrupt the incoming data stream and thus cause a corruption of a data word that is to be written into the memory 10. When this happened to some critical data of the system unfortunately, the problem would exert a serious influence on the entire system operation.

SUMMARY OF THE INVENTION

Taking the above into consideration, an object of the present invention is to provide a signal resynchronization apparatus which avoids read data corruption.

Particularly, the present invention aims to provide a signal resynchronization apparatus which avoids the corruption of such critical data that may affect the entire system operation.

To accomplish the above objects, according to the present invention, there is provided a signal resynchronization apparatus which receives a data stream in synchronization with a first clock and outputs the data stream in synchronization with a second clock, where the data stream contains a plurality of data words having an N-byte cyclic data structure. This apparatus comprises the following elements: (a) an input unit which receives the data stream from an external source; (b) a storage unit, having a capacity of at least (M×N) bytes (M=2, 3, 4, . . . ), which stores the data stream received by the input unit; (c) a data writing unit, having a write address pointer, which sequentially writes each data word of the received data stream into the storage unit in synchronization with the first clock; (d) a data reading unit, having a read address pointer, which sequentially reads out each data word from the storage unit in synchronization with the second clock; (e) an output unit which outputs to an external destination the data words read out by the data reading unit; (f) a detection unit which detects that the write and read address pointers have come within a predetermined threshold distance; and (g) a relocation unit which moves the read address pointer by (P×N) bytes (P=1, 2, 3, . . . ) to increase the distance between the read and write address pointers, when the detection unit has detected that the write and read address pointers have come within the predetermined threshold distance.

Further, to accomplish the above objects, according to the present invention, there is provided a signal resynchronization apparatus which receives a data stream in synchronization with a first clock and outputs the data stream in synchronization with a second clock, where the data stream contains a plurality of data words having an N-byte cyclic data structure. This apparatus comprises the following elements: (a) an input unit which receives the data stream from an external source; (b) a storage unit which stores the data stream received by the input unit; (c) a decision data generator which generates decision data that is used to determine whether the received data stream is correct; (d) an insertion unit which inserts the decision data generated by the decision data generator into the N-byte data stream received by the input unit; (e) a data writing unit, having a write address pointer, which sequentially writes each data word of the N-byte data stream with the decision data into the storage unit in synchronization with the first clock; (f) a data reading unit, having a read address pointer, which sequentially reads out each data word of the N-byte data stream from the storage unit in synchronization with the second clock; and (g) a decision unit which tests whether the data words read out by the data reading unit are correct, referring to the decision data inserted therein.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 3 is a diagram which shows a memory space arrangement of a storage unit shown in FIG. 1 and an example of data words stored therein;

FIG. 12 is a diagram which shows a memory space arrangement of the conventional apparatus of FIG. 11 and an example of data words stored therein;

DESCRIPTION OF THE PREFERRED EMBODIMENTS

Four preferred embodiments of the present invention will be described below with reference to the accompanying drawings.

Figure 1:
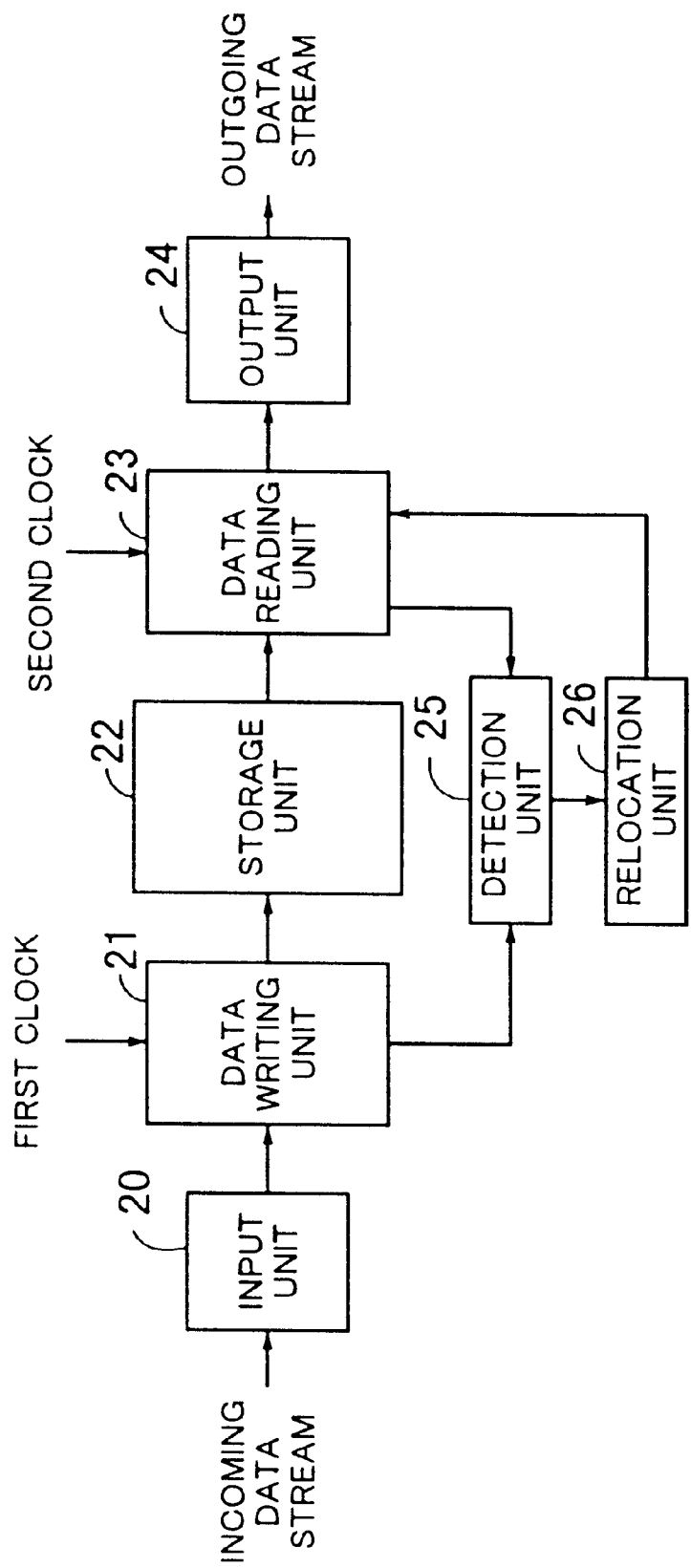
FIG. 1 is a block diagram of a first embodiment of the present invention.
Figure 2:
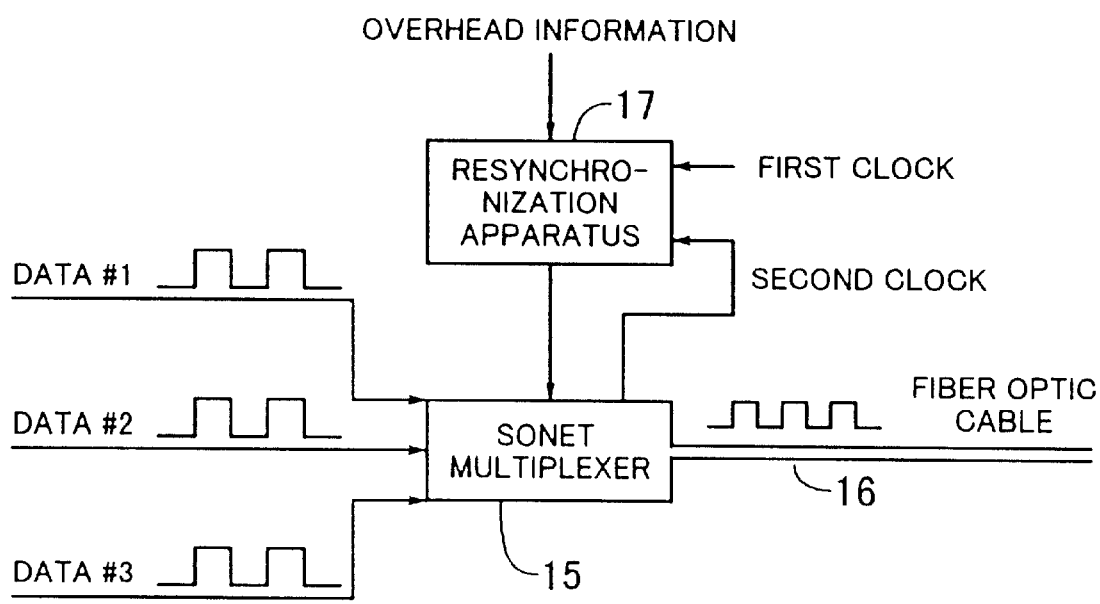
FIG. 2 is a block diagram of a typical digital communication apparatus employing the first embodiment of the present invention.

FIG. 1 is a block diagram of a signal resynchronization apparatus according to a first embodiment of the present invention, which is implemented as part of, for example, a SONET digital communications apparatus of FIG. 2. As FIG. 2 illustrates, this signal resynchronization apparatus 17 receives SONET overhead information from an external source in synchronization with a first clock that is contained in the incoming information signal itself. It outputs the received information, resynchronizing it with a second clock that is supplied from a SONET multiplexer 15.

More specifically, the SONET overhead includes: frame synchronization signal, error check code, channel identification signal, alarm signals, and other control bytes. The signal resynchronization apparatus 17 receives these items of information in synchronization with the first clock, and outputs them to the SONET multiplexer 15 in synchronization with the second clock.

The SONET multiplexer 15 multiplexes three incoming data streams #1 to #3 to a single outgoing bit stream, and reforms it into a plurality of packets each having a predetermined data length. It then outputs those packets, together with the overhead information supplied from the signal resynchronization apparatus 17. The signal in the form of an optical signal will be transported over a fiber optic cable 16.

Referring back to FIG. 1, an input unit 20 receives an incoming data stream having a frame structure of N bytes. Here, the term "frame" refers to a cyclic structure of the incoming data stream, whose repetition cycle is N bytes. A storage unit 22 comprises a dual port memory device having two separate ports for simultaneous read and write operations. The capacity of this storage unit 22 is 2×N bytes (i.e., ADDRESS:1, 2 , . . . 2N) as illustrated in FIG. 3. A data writing unit 21 sequentially writes each data word supplied from the input unit 20 into the storage unit 22, moving its write address pointer from ADDRESS:1 to ADDRESS:2N, in synchronization with the first clock. When the write address pointer has reached the end address 2N, the data writing unit 21 resets it to the first address 1 to continue the data write operation. A data reading unit 23, on the other hand, sequentially reads out the data words aligned in the storage unit 22 in synchronization with the second clock. Its read address pointer scans from ADDRESS:1 to ADDRESS:2N, and after reaching the end ADDRESS: 2N, it returns to ADDRESS:1 to continue the data read operation. An output unit 24 receives the data words read by the data reading unit 23 and sends them to the SONET multiplexer 15.

A detection unit 25 compares the write address pointer of the data writing unit 21 with the read address pointer of the data reading unit 23 to check whether the distance between the two pointers has been reduced to a predetermined threshold. A relocation unit 26 is designed to move the read address pointer by N bytes when the detection unit 25 has detected the proximity of the write and read address pointers.

The operation of the above signal resynchronization apparatus will now be described below.

When the digital communications apparatus of FIG. 2 is powered up, the input unit 20 begins to receive overhead information. Subsequently, the data writing unit 21 begins extracting a clock signal from the data supplied by the input unit 20. This extracted (or reproduced) clock signal is referred to as the first clock. With this first clock, the data writing unit 21 writes each data word into the storage unit 22 sequentially.

On the other hand, the data reading unit 23 starts operation when a predetermined number of data words have accumulated in the storage unit 22. The relationship between the two pointers is now established so that read address pointer will follow the write address pointer while keeping at least a predetermined amount of distance.

The data writing unit 21 sequentially writes the incoming data words into the storage unit 22, from ADDRESS:1 to ADDRESS:2N, in synchronization with the first clock. As a result, the first N-byte data area (i.e., ADDRESS:1 to ADDRESS:N) is filled with one data frame (i.e., data1 to dataN), while the second N-byte data area (i.e., data(N+1) to data2N) with another data frame (i.e., another set of data1 to dataN), as shown in FIG. 3. When still another data frame comes subsequently to the above two frames, the data writing unit 21 resets the write address pointer to ADDRESS:1 to continue the operation, overwriting the first frame.

In parallel with the above, the data reading unit 23 makes access to the other port of the storage unit 22 to read out what the data writing unit 21 has written so far, with its read address pointer being delayed by a predetermined address offset.

Figure 4:
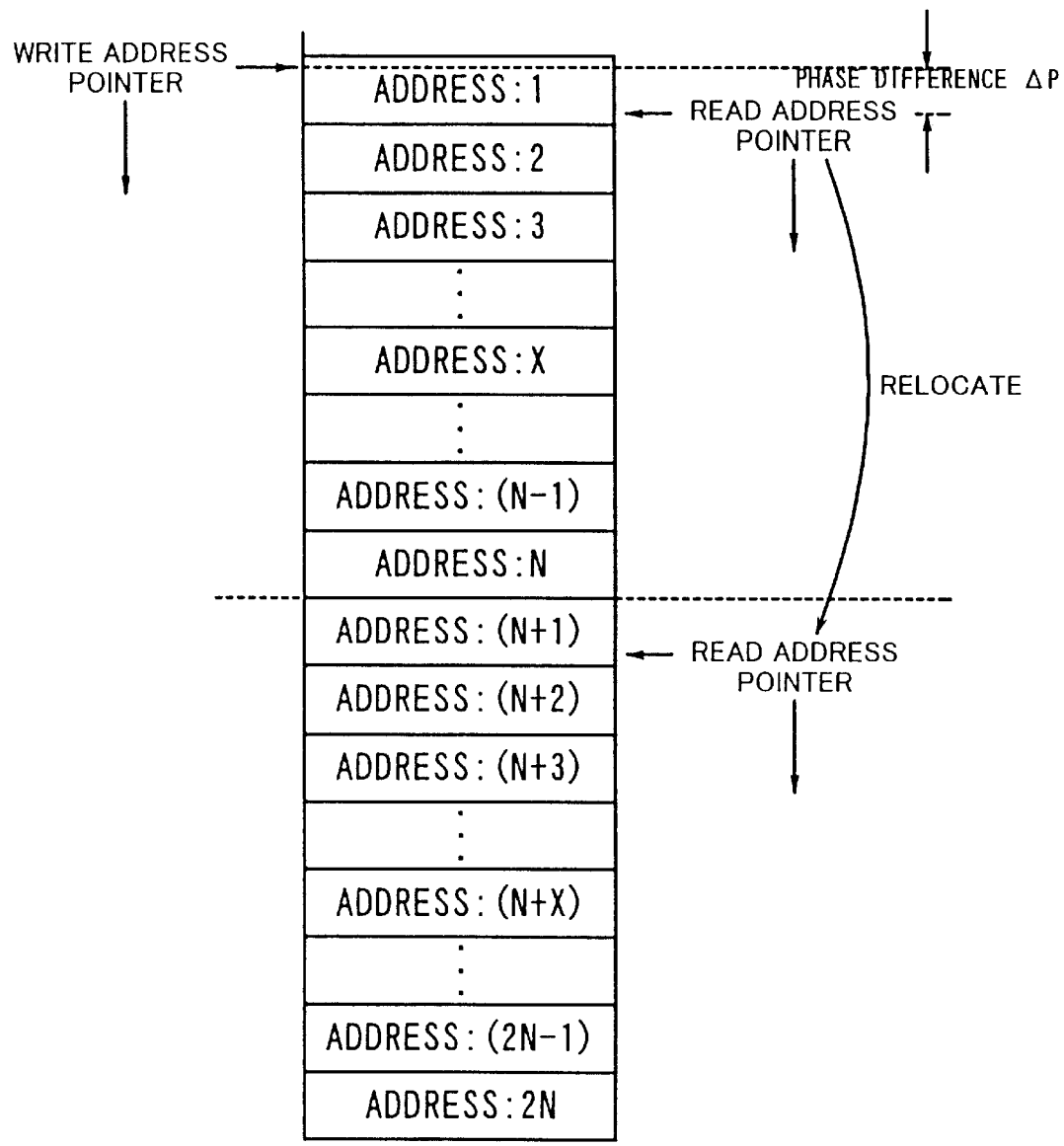
FIG. 4 is a diagram which explains the detailed operation of a relocation unit shown in FIG. 1.

Suppose here that the phase difference AΔP between the write and read address pointers has become smaller for some reason, such as power supply fluctuations and/or ambient temperature variations, as shown in FIG. 4. The detection unit 25 monitors these pointers, and if their phase difference is not greater than a predetermined threshold value M (e.g., M=1), it sends a control signal to the relocation unit 26. This control signal triggers the relocation unit 26 to make the data reading unit 23 advance its read address pointer by N bytes. FIG. 4 shows an example of this pointer relocation, in which the read address pointer is moved from ADDRESS:1 to ADDRESS:(N+1). As a result, the data reading unit 23 supplies the output unit 24 with a data word read out of ADDRESS:(N+1), instead of ADDRESS:1, and then it continues reading ADDRESS:(N+2), ADDRESS:(N+3), and so on. By relocating the read address pointer in this way, the first N-byte data at ADDRESS:1 to ADDEESS:N is skipped, or discarded. This means that the signal resynchronization apparatus does not guarantee that its output data is always identical with the input data. Fortunately, however, the data stream of interest (i.e., overhead information) has a fixed data structure of N bytes, and its contents do not change so often. Therefore, the above-described N-byte relocation of the read address pointer would not cause serious problems since the output data is likely to be the same as the input data.

Rather, the problem lies in a data corruption caused by a possible overlap of the read and write address pointers. Data corruption would produce an unusual bit pattern in the overhead information, which could lead to system disruption. In SONET networks, for example, data corruption, if happened to the aforementioned K1/K2 bits, would severely affect the entire network. However, the present embodiment protects the network from the influence of corrupted K1/K2 bits, since, even if the relocation of the read pointer occurred in the middle of a read operation of K1/K2 bits, the apparatus outputs the previous frame data including valid K1/K2 bits.

As described above, the signal resynchronization apparatus of the first embodiment employs a storage unit 22 capable of buffering 2N bytes, and in addition, the apparatus is configured to move the read address pointer by N bytes when its distance from the write address pointer has decreased to a predetermined threshold. This proposed configuration prevents the read data from such a serious corruption that causes a system disruption in conventional systems.

Although the storage unit 22 in the first embodiment is configured to have the capacity of 2N bytes, the present invention is not limited to this specific value of data capacity, but the capacity of the storage unit 22 can be 3N bytes or larger. In this alternative configuration, the read address pointer will be moved by (P×N) bytes (P=1, 2, 3. . . ), when the write and read address pointers have come within a predetermined threshold distance.

Further, with respect to the operation of the first embodiment, the above description has assumed that the read address pointer outpaces the write address pointer. In reverse, it can happen that the write address pointer outpaces the read address pointer. Note that the present invention will work properly in the latter case.

Figure 5:
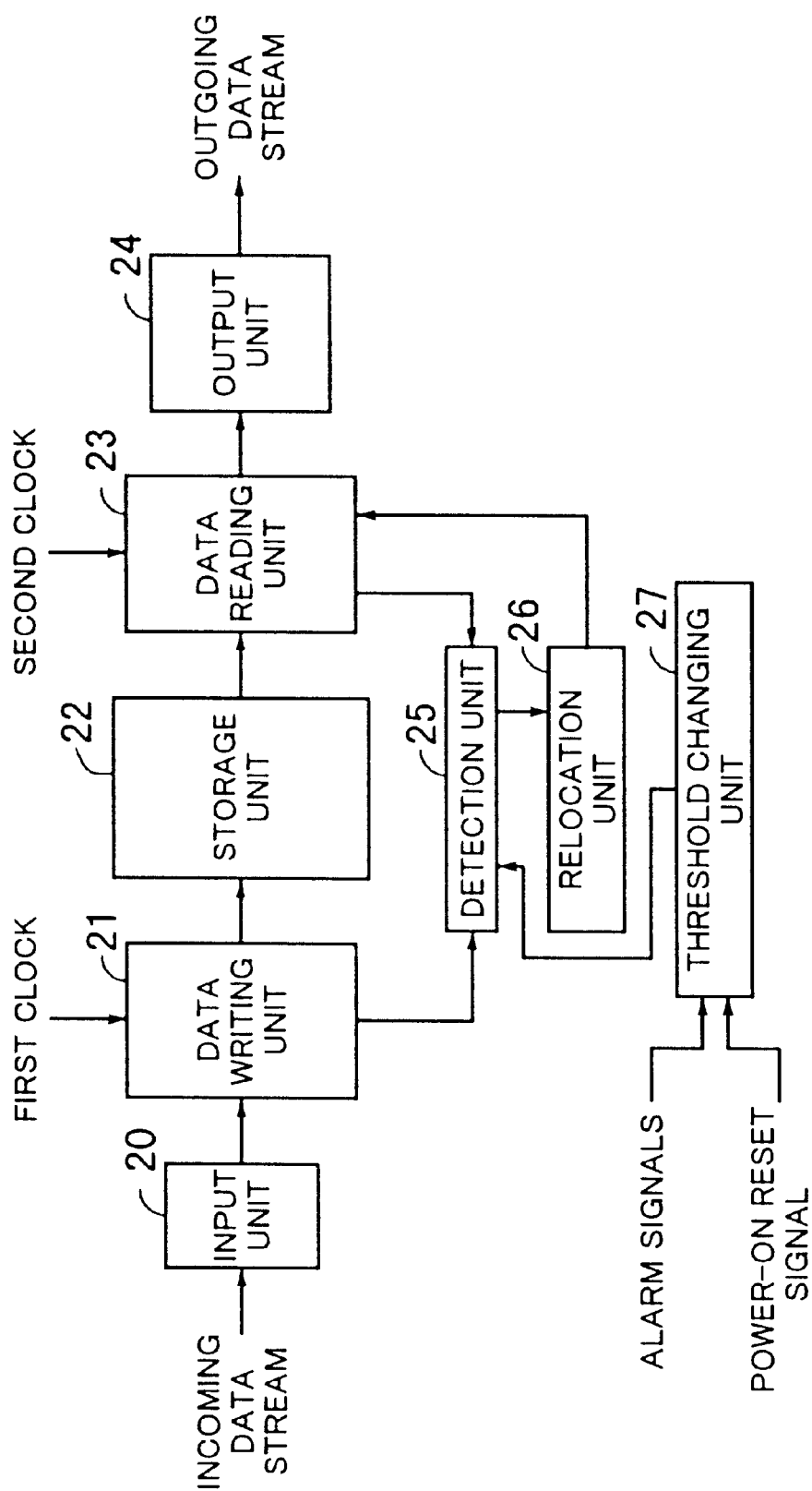
FIG. 5. is a block diagram of a second embodiment of the present invention.

Referring now to FIG. 5, the next section will present a second embodiment of the present invention. Since the second embodiment has basically the same structure as the first embodiment illustrated in FIG. 1, the following section will focus on its distinctive points, while affixing like reference numerals to like elements.

The second embodiment of the present invention differs from the first embodiment in that a threshold changing unit 27 is employed as an additional element. Other elements will operate in the same way as those shown in FIG. 1. The threshold changing unit 27 receives some alarm signals that indicate problems with the digital communications apparatus. It also receives a power-on reset signal that is activated when the digital communications apparatus is powered up. When any of those signals becomes active, the threshold changing unit 27 changes the threshold to a new value that is larger than usual.

The operation of the above signal resynchronization apparatus of the second embodiment will now be described below.

Suppose here that the digital communications apparatus is now turned on, and the input unit 20 begins to receive overhead information. The received data stream is supplied from the input unit 20 to the data writing unit 21. The data writing unit 21 sequentially writes the received data words into ADDRESS:1 to ADDRESS:2N of the storage unit 22 in synchronization with the first clock extracted from the data stream itself. When a predetermined number of data words have been stored in the storage unit 22, the data reading unit 23 starts its operation, thus setting the read address pointer apart from the write address pointer by a predetermined distance. Preferably, the distance between the two pointers is much greater than the threshold M so as to prevent the read address pointer from unnecessarily frequent relocation.

However, since the apparatus is not sufficiently stable in a period just after power-up or failure recovery, the above-described initial distance between the read and write address pointers can be gradually reduced to, and become stable at, a level that is close to the threshold M. Once the apparatus falls into such a situation, power supply fluctuations and/or ambient temperature variations often bring the two pointers to a critical proximity where the relocation unit 26 may frequently move the read address pointer. As described earlier, the read address pointer relocation will effectively avoid such a data corruption that could affect the entire system operation. However, it is not desirable to frequently output substitutive data for overhead information, which may not be exactly the same as what the apparatus has received.

The second embodiment of the present invention solves the above problem by introducing a threshold changing unit 27. This threshold changing unit 27 temporarily raises the threshold value from M to M0 (M0>M) while a predetermined period (e.g., one second) elapses after an alarm signal or power-on reset signal becomes active. As a result, a larger initial distance is established between the read and write address pointers immediately after power-up, thus increasing safety margin for possible drift in the address pointer distance.

Figure 6:
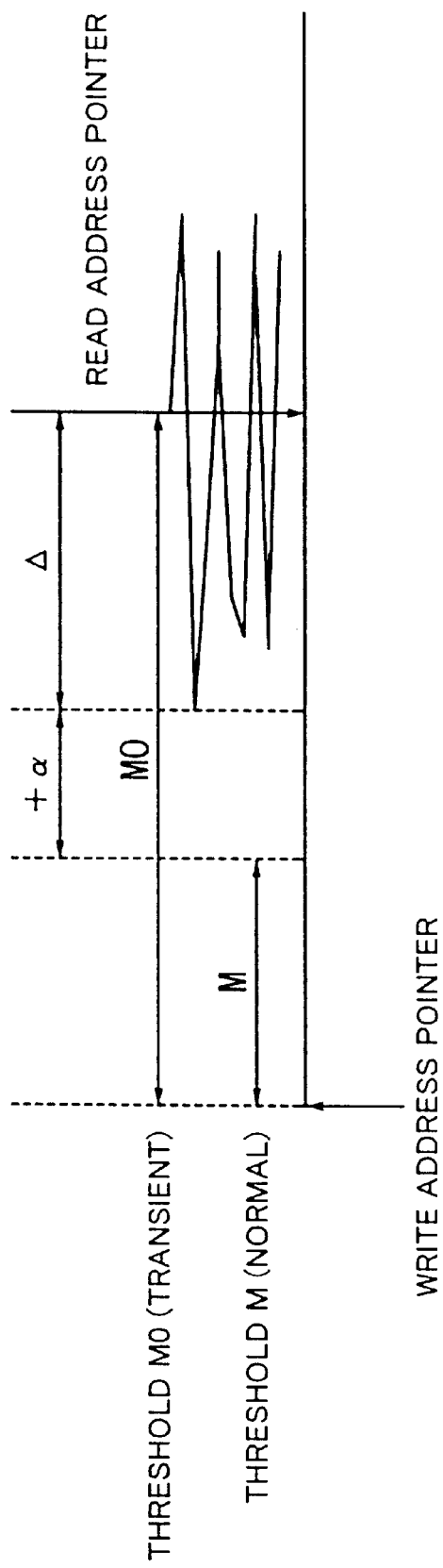
FIG. 6 is a diagram which explains the operation of a threshold changing unit shown in FIG. 5.

The increased threshold value M0 is obtained by adding a predetermined margin α to the normal threshold value M with its steady state phase error Δ, as illustrated in FIG. 6. More specifically, the first and second clocks are not exactly locked with each other, but their frequencies always show some wandering, or variations, even in a steady state. This is referred to as the steady state phase error Δ. For the use in a transient period just after power-up or failure recovery, the threshold value M0 is determined by adding both the steady state phase error Δ and an extra margin α to the normal threshold value M. After the transient period has passed, and when the apparatus has reached a steady state, the distance α remains as a margin of safety.

It should be noted that this large threshold value M0 will narrow the stable operating range (i.e., the range of pointer distances that the detection unit 25 recognizes as adequate) of the signal resynchronization apparatus. As a result, the relocation unit 26 may change the read address pointer more frequently than when the normal threshold value M is used. This frequent pointer relocation, however, is not a problem because its occurrence is limited within a short period after power-up or failure recovery.

In summary, the proposed signal resynchronization apparatus of the second embodiment temporarily uses a larger threshold value to determine whether to relocate the read address pointer, during some particular transient periods in which the apparatus is unstable, such as when it is just powered up or when it is recovering from failure. This structural arrangement gives a predetermined margin to the address pointer distance at the time the apparatus reaches a steady state of operation, thus preventing the apparatus from unnecessarily frequent execution of read address pointer relocation.

Although the storage unit 22 has been illustrated as a memory space of 2N bytes in the above-described second embodiment, the present invention can also be implemented to an N-byte storage unit. Unlike the 2N-byte storage, however, the apparatus will output dissimilar data when the read address pointer is relocated, since the skipping distance should only be N/2 bytes, for instance. The present invention is particularly effective in this case, because it is undesirable to use this dissimilar data in a normal state of operation.

Figure 7:
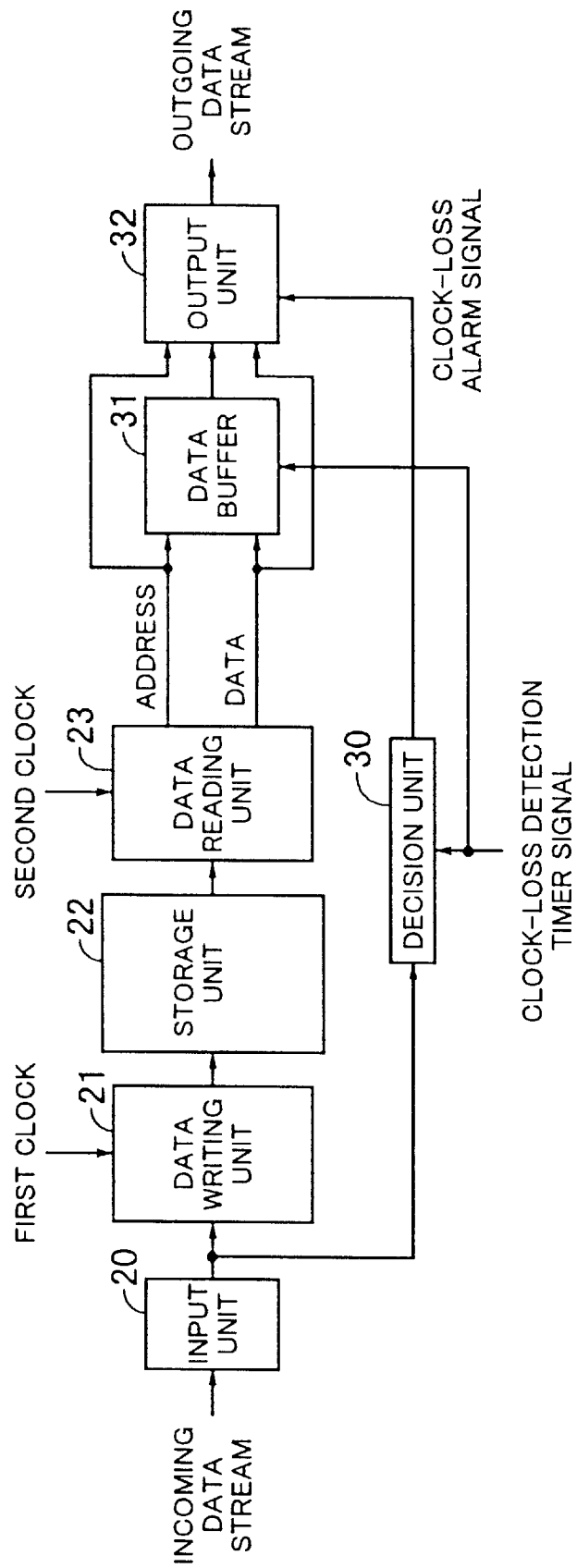
FIG. 7 is a block diagram of a third embodiment of the present invention.

Referring now to FIG. 7, the next section will describe a third embodiment of the present invention.

Figure 8:
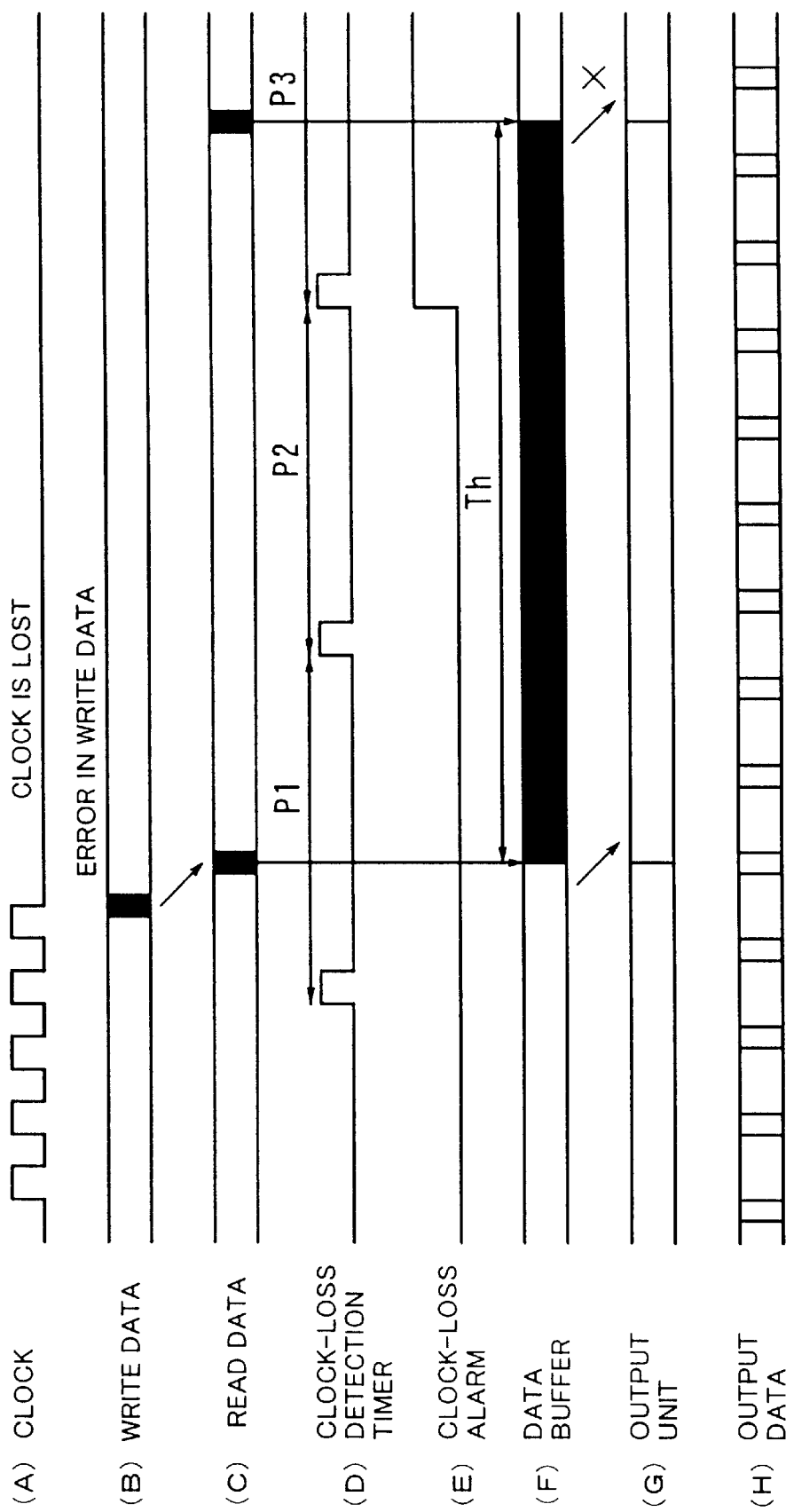
FIG. 8 is a timing diagram which depicts main signal timings of the third embodiment.

FIG. 7 is a block diagram of a signal resynchronization apparatus according to the third embodiment of the present invention. Since this third embodiment has basically the same structure as the first embodiment illustrated in FIG. 1, the following section will focus on its distinctive points, while affixing like reference numerals to like elements. More specifically, the third embodiment avoids the corruption of a particular data word including K1/K2 bits, even if the first clock is lost, as illustrated in FIG. 8, part (A).

Compared to the first embodiment of FIG. 1, the signal resynchronization apparatus of the third embodiment is equipped with a decision unit 30, a data buffer 31, and a new output unit 32, while excluding the detection unit 25, the relocation unit 26, and the output unit 24. From an external source, the decision unit 30 receives a clock-loss detection timer signal which is activated at predetermined intervals as shown in FIG. 8, part (D). During each cycle period of this clock-loss detection timer signal, the decision unit 30 watches the clock signal contained in the incoming data stream, and when no clock edges can be found during a specific cycle period, it will generate an alarm signal to indicate that the clock is lost.

Monitoring each memory address supplied from the data reading unit 23, the data buffer 31 extracts a particular data word including K1/K2 bits out of the data words being read out by the data reading unit 23. The data buffer 31 performs this operation every two cycles of the clock-loss detection timer signal, meaning that each extracted data is saved for two timer intervals.

As long as the clock-loss alarm signal is inactive, the output unit 32 reads out the data word saved in the data buffer 31 immediately before it is replaced with a new data word. The output unit 32 outputs most data words supplied from the data reading unit 23 as they are. Exceptionally, it fetches a particular data word containing K1/K2 bits, not from the data reading unit 23, but from the data buffer 31. Note that this data word has been sampled two timer cycles ago.

The operation of the above signal resynchronization apparatus of the third embodiment will now be described below, particularly in such a situation where the clock signal is lost when writing a data word including K1/K2 bits.

Referring to FIG. 8, it is assumed here that the first clock (A) is lost during a data write cycle in which the data writing unit 21 attempts to write a data word containing K1/K2 bits into a relevant part of the storage unit 22. As a result of the lost clock, the data word containing K1/K2 bits is corrupted as shown in FIG. 8, part (B). Subsequently, the data reading unit 23 reads out the corrupted data (C). On the other hand, the data buffer 31 captures the first instance of the corrupted data word that is read out of the storage unit 22 after the clock-loss detection timer signal (D) becomes active. The captured data is maintained for two cycle intervals (Th) of the clock-loss detection timer signal. Accordingly, the corrupted data word read out by the data reading unit 23 is captured by the data buffer 31 as shown in FIG. 8, part (F).

During each cycle period of the clock-loss detection timer signal (D), the decision unit 30 watches the clock signal (A), and when no clock edges can be found in a specific cycle period, it will generate the alarm signal (E) to indicate a clock failure. In the present context of FIG. 8, the clock pulse (A) is detected in the first period P1, and it is completely lost in the middle of that period. Therefore, the decision unit 30 does not immediately assert the clock-loss alarm signal (E) at the next active edge of the clock-loss detection timer signal (D). The decision unit 30 activates the clock-loss alarm signal at the beginning of the third period P3, since it detects no clock edges during the second period P2.

When the clock-loss alarm signal (E) is inactive, the output unit 32 reads out the data word saved in the data buffer 31 immediately before it is replaced with a new data. Referring to each memory address supplied from the data reading unit 23, the output unit 32 transfers each data word from the data reading unit 23 to the next stage, except for the data word containing K1/K2 bits. The output unit 32 obtains the K1/K2 bits not directly from the data reading unit 23, but through the data buffer 31. Accordingly, the K1/K2 bits appearing at the output port of the output unit 32 are what have been sampled by the data buffer 31 at every two cycles of the clock-loss detection timer signal. That is, in the present scenario, the corrupted data that has been sampled during the first period P1 and kept in the data buffer 31 is updated in the third period P3. The output unit 32, however, does not take in the corrupted data from the data buffer 31, because the clock-loss alarm signal is active. Instead, it outputs the previous K1/K2 bits that have been held in its internal storage.

Even if the data word containing K1/K2 bits is corrupted by a sudden loss of the clock signal, the proposed apparatus will block the corrupted data from being transmitted. Generally speaking, some amount of time is required to detect the loss of a clock signal, because clocks are periodical events with finite time intervals. In other words, there is an inevitable time delay between the occurrence of clock loss and the subsequent blocking of corrupted data, which is illustrated in FIG. 8 as the time Th. It is therefore necessary to block the corrupted data from being transmitted. The third embodiment of FIG. 7 is configured to temporarily hold a particularly important data word containing K1/K2 bits, which would cause a severe effect if corrupted, for at least a predetermined period Th. This data word is transmitted after it is confirmed that the clock signal hag been continuously supplied (this indicates the integrity of K1/K2 bits). In this way, the third embodiment prevents the K1/K2 bits from being transmitted, when they are likely to be corrupted.

The following paragraphs will provide several additional considerations about the third embodiment described above.

First, it should be noted that the data buffer 31 and output unit 32 serve as a delay element that delays the incoming K1/K2 bits by a predetermined delay time Th. Since the data buffer 31 and output unit 32 are empty at first, the apparatus is unable to output the K1/K2 bits in some transient periods such as power-up or recovery from failure. This can be solved by configuring the apparatus to output zeros as the initial values of K1/K2 bits, since their normal values are zeros.

Second., in case there arises a problem situation that requires the APS function to start, the signal resynchronization apparatus would receive an incoming data stream including K1/K2 bits with non-zero values. Although the K1/K2 bits are delayed by the predetermined interval (about 250 $\mu$s) for the above reason, this time delay will be almost negligible.

Thirds in the third embodiment, the data reading unit 23 is designed to continue its operation even if the first clock is lost. This means that the same data words are continuously read out of the storage unit 22 and transmitted by the output unit 32. The output unit 32, however, can alternatively be configured to stop its operation when a clock-loss alarm is raised. Furthermore, it may be possible to make the output unit 32 send zeros for all data words except for those that contain K1/K2 bits.

Lastly, the storage unit 22 has been illustrated as a storage space of 2N bytes in the above-described third embodiment. However, the present invention is not limited to this specific capacity, but can also be applied to other possible configurations of the storage unit 22.

Figure 9:
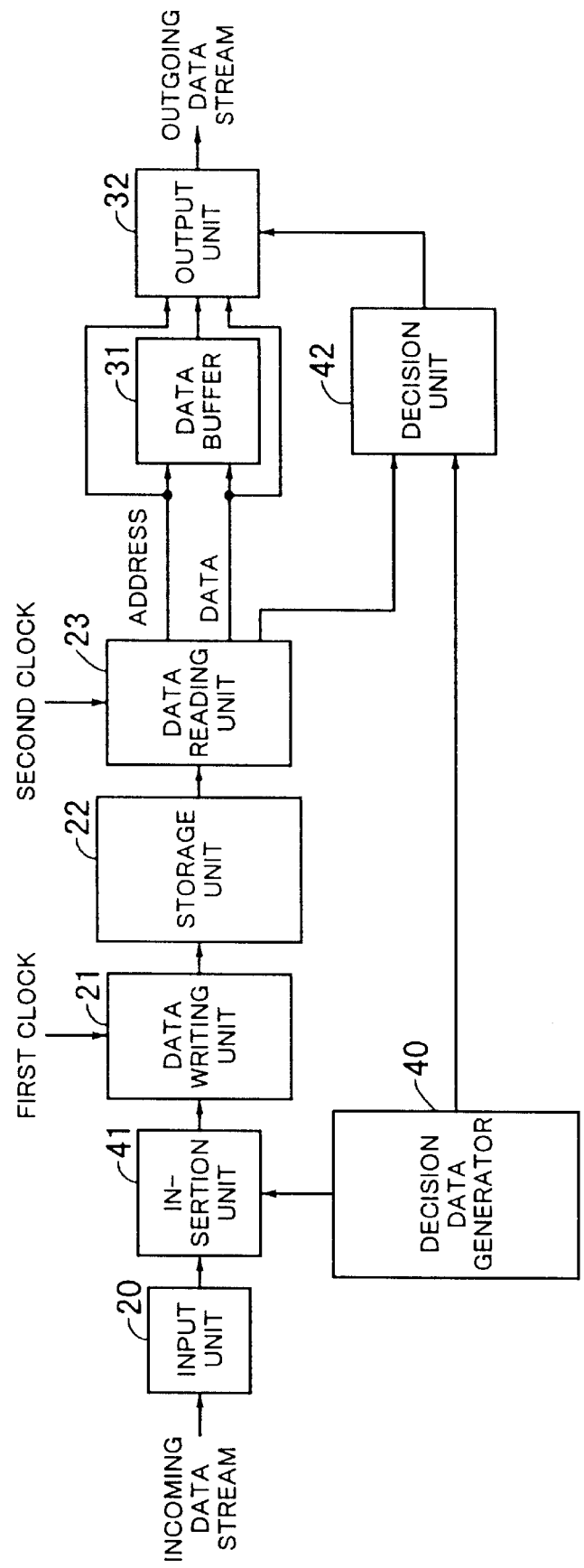
FIG. 9 is a block diagram of a fourth embodiment of the present invention.

Referring now to FIG. 9, the next section will describe a fourth embodiment of the present invention.

FIG. 9 is a block diagram of a signal resynchronization apparatus according to the fourth embodiment of the present invention. Since this fourth embodiment has basically the same structure as the third embodiment illustrated in FIG. 7, the following discussion will focus on its distinctive points, while affixing like reference numerals to like elements. The fourth embodiment differs from the third embodiment of FIG. 7 in that it employs a decision data generator 40, an insertion unit 41, and a new decision unit 42, instead of the decision unit 30.

The decision data generator 40 produces a two-bit binary code that cyclically varies from "00" to "11" each time a new frame arrives from the input unit 20. The decision data generator 40 supplies the insertion unit 41 and the decision unit 42 with this code as the decision data, or "marker code." The insertion unit 41 inserts the received marker code to a predetermined portion of the frame data, and the data writing unit 21 writes this frame data into the storage unit 22. As a result, each frame data stored in the storage unit 22 will have either one of the four marker codes: "00," "01," "10," and "11." The decision unit 42, on the other hand, checks the marker code contained in each frame data that the data reading unit 23 reads out of the storage unit 22. By comparing its bit pattern with the previous one's, the decision unit 42 checks the availability of the first clock, which should be contained in the incoming data stream.

The operation of the fourth embodiment will now be described in more detail below.

As mentioned earlier, each frame data consists of N-byte information, "data1" to "dataN." The decision data generator 40 produces one pattern of marker bits for each those N bytes. Suppose, for example, that the decision data generator 40 produces a marker code "00" and sends it to the insertion unit 41.

The insertion unit 41 inserts the given marker code into the frame data received from the input unit 20. More specifically, the insertion unit 41 uses an unused portion of each incoming frame data to store marker bits. Preferably, such portion is located near the end of a frame. The data writing unit 21 writes such frame data into the storage unit 22 each time it is provided from the insertion unit 41.

Figure 10:
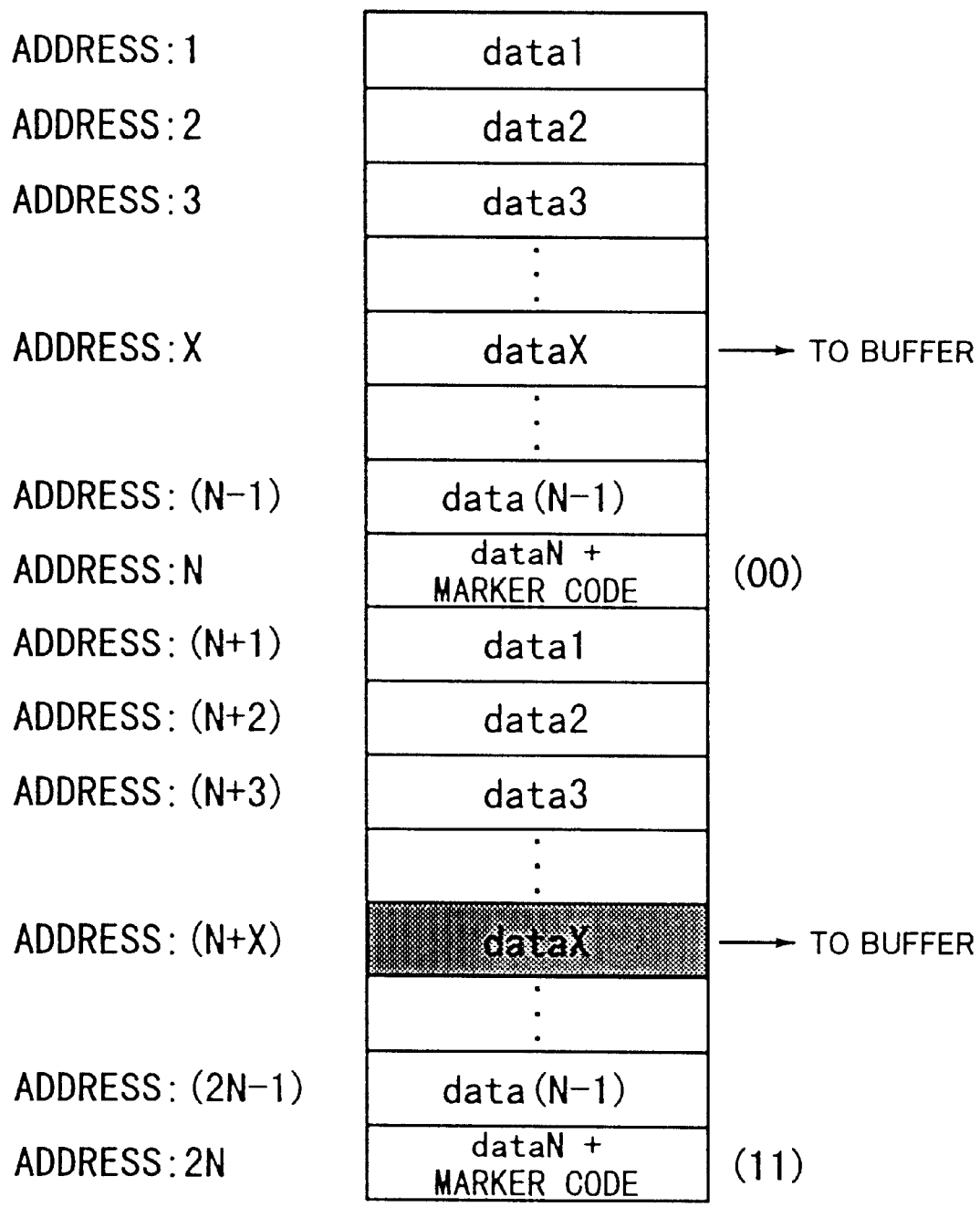
FIG. 10 is a diagram which shows a memory space arrangement of a storage unit shown in FIG. 9 and an example of data words stored therein.
Figure 11:
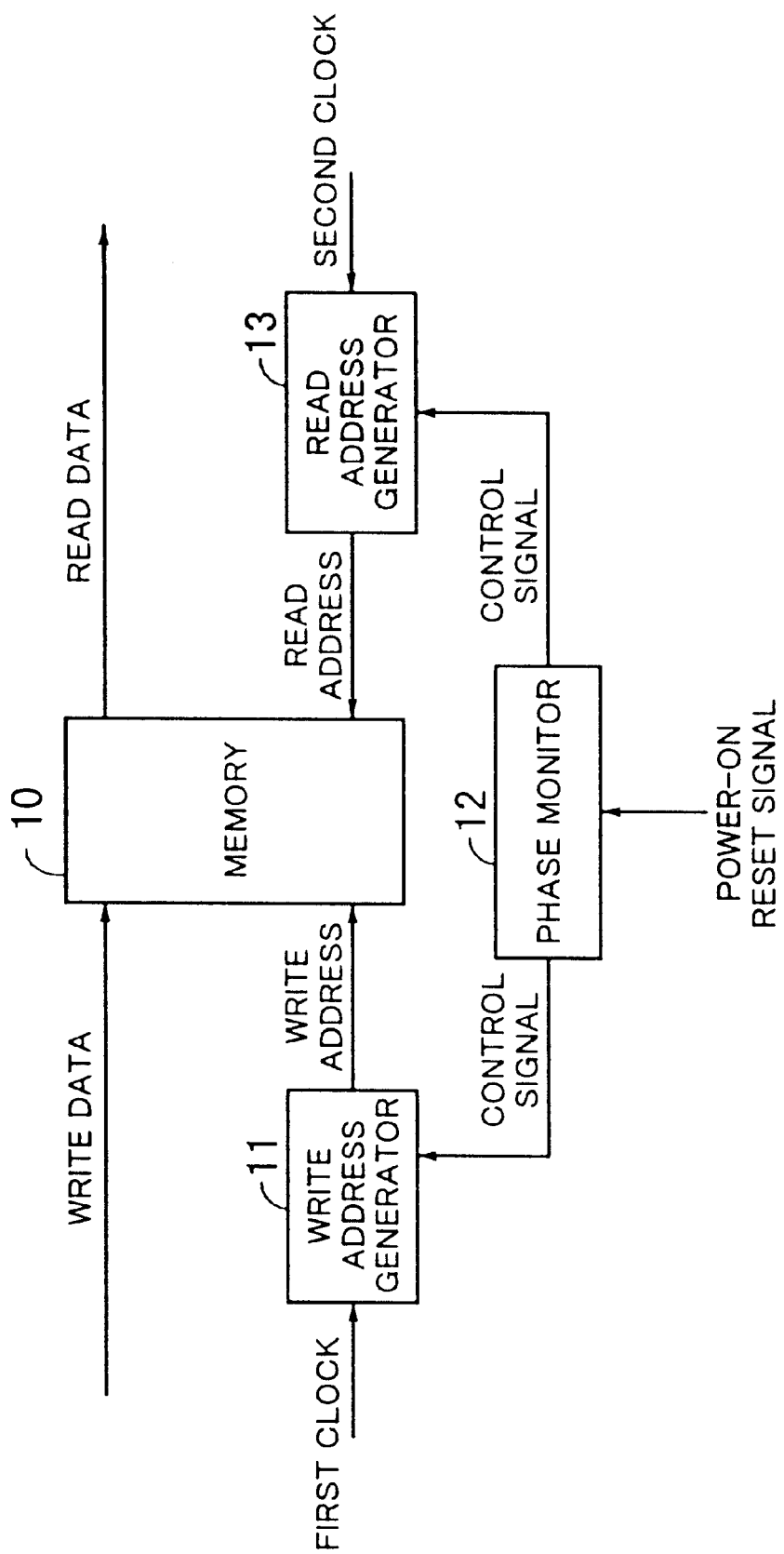
FIG. 11 is a block diagram which shows a typical configuration of a conventional signal resynchronization apparatus.
Figure 13:
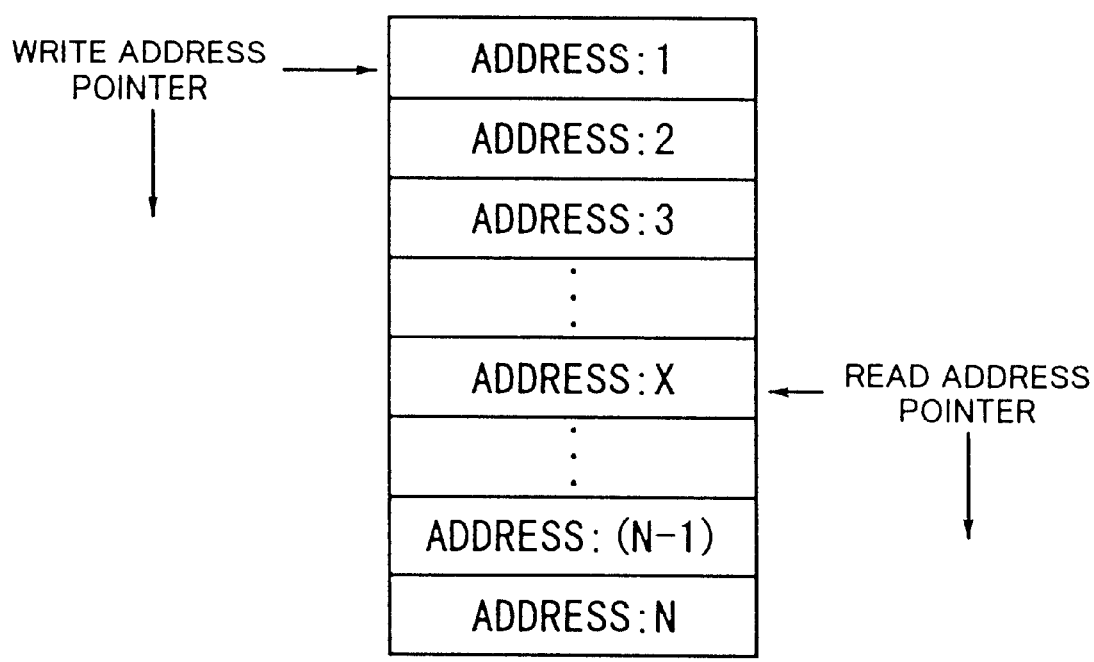
FIG. 13 is a diagram which explains the operation of the conventional apparatus of FIG. 11.
Figure 14:
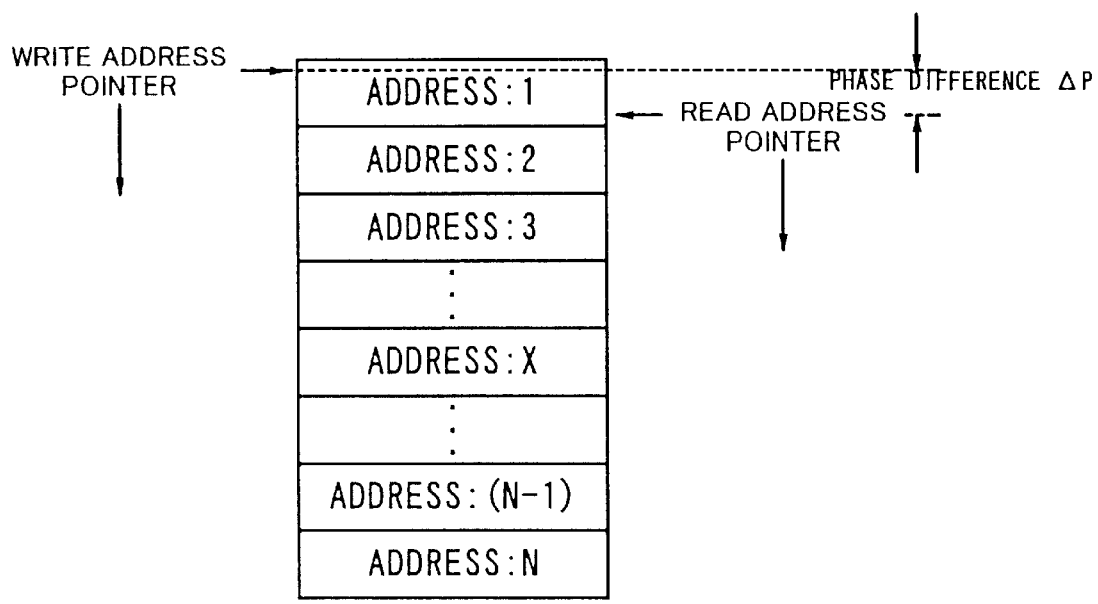
FIG. 14 is another diagram which explains the operation of the conventional apparatus of FIG. 11.

FIG. 10 depicts an example of data words stored in the storage unit 22 in this way. This example shows that a marker code is inserted as part of "dataN" located at ADDRESS:N. The data reading unit 23 reads out each data word from the storage unit 22 in synchronization with the second clock. Assume here that the K1/K2 bits are contained in the "dataX" located at ADDRESS:X. The data reading unit 23 scans the storage unit 22, and when this ADDRESS:X is reached, it transfers this "dataX" to the data buffer 31.

After that, the data reading unit 23 reads out "dataN" at ADDRESS:N, extracts a marker code ("00" in the present context) from the data, and supplies it to the decision unit 42. The decision unit 42 determines whether the marker code extracted this time is correct or not by comparing it with that extracted last time. In the present example, the marker code has changed from "11" to "00," and the decision unit 42 recognizes this transition as correct. This comparison result permits the data word including K1/K2 bits to be transferred from the data buffer 31 to the output unit 32. The output unit 32 accepts the data word containing K1/K2 bits only when the decision unit 42 has successfully validated the marker code. This data word held in the output unit 32 will be sent out in the next frame as "dataX."

Suppose here that the first clock is lost during the write operation of an incoming data word "dataX" to ADDRESS: (N+X), causing data corruption. Because of the lack of the first clock, the data writing unit 21 fails to update the subsequent memory addresses including ADDRESS:2N, where the old marker code "11" remains without change. When the data reading unit 23 reaches ADDRESS:2N, the decision unit 42 detects the irregularity of the marker code in question, because its value "11" does not agree with what is expected to succeed the previous value "01." Accordingly, the data word stored in the data buffer 31 will not be transferred to the output unit 32, for this data word is possibly corrupted. The output unit 32 outputs a valid data word "dataX," which was transferred from ADDRESS:X in the previous frame and has been stored in its internal storage. In this way, the apparatus blocks the corrupted K1/K2 bits from being transmitted.

As described above, the fourth embodiment of the present invention puts an additional cyclic marker to each write data word for later reference. When reading out the data words from storage, the apparatus examines their marker codes in terms of orderliness of their sequence to determine the validity of the stored data. The apparatus is configured to output K1/K2 bits in the previous frame as long as the marker codes continue in orderly sequence, thus preventing corrupted K1/K2 bits from being transmitted.

Although the storage unit 22 has been illustrated as a buffer memory of 2N bytes in the fourth embodiment, the present invention is not restricted to this particular storage capacity, but can also work in the case of N bytes or other possible configurations of the storage unit 22.

The above discussion is now summarized as follows. The present invention proposes a signal resynchronization apparatus which receives a data stream in synchronization with a first clock and outputs the data stream in synchronization with a second clock. The incoming data stream, which contains a plurality of data words with an N-byte cyclic data structure, is written by a data writing unit into a storage unit having a capacity of (M×N) bytes (M=2, 3, 4, . . . ). In parallel with this, a data reading unit sequentially reads out each data word from the storage unit in synchronization with the second clock. When a detection unit detects that the distance between the read and write address pointers has decreased to a predetermined threshold, a pointer relocation unit moves the read address pointer by (P×N) bytes (P=1, 2, 3, . . . ) to increase the distance. Being configured as such, the proposed apparatus avoids the corruption of such critical data that may seriously affect the entire system operation.

The present invention proposes another signal resynchronization apparatus which receives a data stream in synchronization with a first clock and outputs the data stream in synchronization with a second clock. A data writing unit writes the incoming data stream into a storage unit, while a data reading unit sequentially reads out each data word from the storage unit. When the distance between the read and write address pointers has reached, or falls below, a predetermined threshold, the read address pointer is relocated by a predetermined distance. This threshold is temporarily increased when the apparatus is powered up or when the apparatus is recovering from failure. This configuration ensures the stability of operation in some particular transient periods (e.g., when the apparatus is powered up), in which conventional apparatus often encounter a problem of insufficient steady-state margins of pointer distance, which causes unnecessarily frequent execution of read address pointer relocation.

The present invention proposes still another signal resynchronization apparatus which receives a data stream in synchronization with a first clock and outputs the data stream in synchronization with a second clock, where the data stream contains a plurality of data words with an N-byte cyclic data structure. A data writing unit writes the incoming data stream into a storage unit, while a data reading unit sequentially reads out each data word from the storage unit. A particular data word read out by the data reading unit is saved in a data buffer, which is retrieved and transmitted by an output unit when a decision unit has determined that the first clock is available. The apparatus configured as such prevents the loss of the first clock signal and subsequent data corruption from seriously affecting the system operation.

The present invention proposes a further signal resynchronization apparatus which receives a data stream in synchronization with a first clock and outputs the data stream in synchronization with a second clock, where the data stream contains a plurality of data words having an N-byte cyclic data structure. The apparatus has a decision data generator to generate decision data and an insertion unit to insert the decision data to a predetermined portion of the N-byte data stream. A data writing unit writes the N-byte data stream with the decision data into a storage unit, and in parallel with this, a data reading unit reads out each data word from the storage unit. A particular data word read out by the data reading unit is saved in a data buffer. When a decision unit recognizes that the first clock is properly working, an output unit extracts the particular data word from the data buffer and outputs it. The apparatus configured as such will prevent the loss of the first clock signal and subsequent data corruption from seriously affecting the system operation.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A signal resynchronization apparatus which receives a data stream in synchronization with a first clock and outputs the data stream in synchronization with a second clock, the data stream containing a plurality of data words with an N-byte cyclic data structure, the apparatus comprising:

input means for receiving the data stream from an external source;

storage means, having a capacity of at least (M×N) bytes (M=2, 3, 4, . . . ), for storing the data stream received by said input means;

writing means, having a write address pointer, for sequentially writing each data word of the received data stream into said storage means in synchronization with the first clock;

reading means, having a read address pointer, for sequentially reading out each data word from said storage means in synchronization with the second clock;

output means for outputting to an external destination the data words read out by said reading means;

detection means for detecting that the write and read address pointers have come within a predetermined threshold distance; and relocation means for moving the read address pointer by (P×N) bytes (P=1, 2, 3, . . . ) to increase the distance between the read and write address pointers, when said detection means has detected that the write and read address pointers have come within the predetermined threshold distance.

2. A signal resynchronization apparatus which receives a data stream in synchronization with a first clock and outputs the data stream in synchronization with a second clock, the apparatus comprising:

input means for receiving the data stream from an external source;

storage means for storing the data stream received by said input means;

writing means, having a write address pointer, for sequentially writing each data word of the received data stream into said storage means in synchronization with the first clock;

reading means, having a read address pointer, for sequentially reading out each data word from said storage means in synchronization with the second clock;

output means for outputting to an external destination the data words read out by said reading means;

detection means for detecting that the write and read address pointers have come within a predetermined threshold distance;

relocation means for moving the read address pointer by a predetermined distance to increase the distance between the read and write address pointers, when said detection means has detected that the write and read address pointers have come within the predetermined threshold distance; and threshold changing means for temporarily increasing the threshold distance for a predetermined period when the apparatus is powered up or when the apparatus is recovering from failure.

* * * * *